United States Patent [19]

Ciokajlo et al.

[11] Patent Number: 4,965,994
[45] Date of Patent: Oct. 30, 1990

[54] JET ENGINE TURBINE SUPPORT

[75] Inventors: John J. Ciokajlo, Cincinnati, Ohio; Henry B. Ritchie, Ft. Pierce, Fla.

[73] Assignee: General Electric Company, Cincinnati, Ohio

[21] Appl. No.: 285,569

[22] Filed: Dec. 16, 1988

[51] Int. Cl.⁵ ............................................. F02C 3/00
[52] U.S. Cl. ................................. 60/39.75; 60/39.31
[58] Field of Search ................ 60/39.75, 39.31, 39.32, 60/39.161

[56] References Cited

U.S. PATENT DOCUMENTS

| | | | |
|---|---|---|---|
| 2,614,386 | 10/1952 | McLeod et al. | 60/39.31 |
| 2,676,459 | 4/1954 | Marchant | 60/39.31 |
| 2,875,579 | 3/1959 | Gerdan et al. | 60/39.31 |
| 2,930,662 | 3/1960 | Henstridge | 60/39.31 |
| 2,977,758 | 4/1961 | Haworth et al. | 60/39.31 |
| 3,372,542 | 3/1968 | Sevetz | 60/39.31 |
| 4,114,368 | 9/1978 | Davis et al. | 60/39.161 |
| 4,483,149 | 11/1984 | Rider et al. | 60/39.31 |

OTHER PUBLICATIONS

F110-GE-100 Engine Airflow Diagram, 2/85 Drawing Date.
Installation Handbook for Turbojet Engines (General Electric Company, First Printing 9/1952), FIG. 17-4, page 314.
Foreign Engine—2 page schematic, 5/1953.
Pratt and Whitney Presentation—F100 Engine Casing, 5/1970.
GE CF6-80C2 Engine Family Drawing.
Crokajlo et al., Exoskeletal Structures (GE), AIAA Conference, Jul. 11-14, 1988.

Primary Examiner—Louis J. Casaregola
Assistant Examiner—Timothy S. Thorpe
Attorney, Agent, or Firm—Douglas E. Erickson; Jerome C. Squillaro

[57] ABSTRACT

A jet engine subassembly. The high pressure (HP) turbine includes a ball bearing assembly whose inner race is attached to the HP turbine shaft. The outer race takes radial loads through radially-extending tie rods which pass through the HP turbine nozzle vanes and are connected to the combustor's outer casing. The outer race takes axial loads through a support cone which is attached to the combustor diffurser's radially inner duct through an intermediate forward segment of the combustor inner casing. This eliminates the need for a heavy turbine frame. The ball bearing is the thrust bearing, and does not experience thermal axial growth. This allows the use of unshrouded sloped HP turbine blades.

9 Claims, 1 Drawing Sheet

JET ENGINE TURBINE SUPPORT

CROSS-REFERENCE TO RELATED APPLICATIONS

The inventors of the present invention have concurrently filed a related patent application entitled "Jet Engine Fan and Compressor Bearing Support".

BACKGROUND OF THE INVENTION

The present invention relates generally to jet engines and more particularly to a support for the turbine of a jet engine which eliminates the need for conventional engine frames and which eliminates the need for shrouds on the high pressure sloped turbine blades.

Jet engines include a core turbojet engine. The parts of a core turbojet engine include a compressor followed in order by a combustor, a turbine, and an exhaust nozzle. The compressor compresses incoming air for better combustion of the fuel injected into the combustor. The burning gases from the combustor turn the high pressure turbine blades to drive the compressor and then exit the exhaust nozzle to supply thrust to the engine.

Certain types of jet engines, such as a bypass turbofan jet engine with the fan at the front (generally called a front-fan engine) have additional engine parts to produce thrust more efficiently. The front-fan engine derives some of its thrust from a core turbojet engine and some of its thrust from an added front fan wherein the outer portion of the airflow from the front fan bypasses the core turbojet engine. Front fans, driven by an added low pressure turbine section (which follows the core engine's high pressure turbine section), act like propellers to supply added thrust to the engine.

The high and low pressure turbine sections each include one or more turbine stages. A turbine stage includes a row of rotating blades whose tips clear the surrounding turbine stator casing. A rotating blade of larger radius produces more power than one of smaller radius. Sloped turbine blades (herein defined to be turbine blades with sloped blade tips) allow the jet engine designer to more easily increase the turbine blade radius in later stages.

Conventional turbine bearing assemblies are of the roller bearing type which experience axial thermal growth in the following manner. A roller bearing assembly has its inner race affixed to a turbine shaft which leads to the turbine blades and has its outer race usually affixed to a turbine frame which leads to the turbine stator casing. One race (such as the outer race) axially captures the roller bearing which is free to axially slide with respect to the other race (such as the inner race) under thermal growth conditions. Thus, as the turbine shaft experiences thermal axial growth, the axial sliding of the roller bearing causes relative axial movement of the turbine blades with respect to the turbine stator casing. Therefore, the sloped turbine blades require blade shrouds attached to their tips to maintain proper tip clearances under axial thermal growth conditions, as is known to those skilled in the art.

The high pressure turbine blades experience higher airflow temperatures and greater tip rotation speeds. A high pressure turbine blade shroud typically puts a centrifugal load of several tons on the blade tip while the blade tip is experiencing high temperature conditions.

In known jet engines, there is often an engine frame whose sole purpose is to support the bearings of the jet engine's turbine. This turbine frame adds weight to the engine. The elimination of the turbine engine frame would result in improved specific fuel consumption and lower manufacturing cost. In other known jet engines without turbine engine frames, turbine nozzle vanes (or support rods running through the vanes) support a turbine bearing of the roller bearing type. Such roller bearing assemblies experience thermal axial growth requiring sloped turbine blades to have blade shrouds attached to their tips to maintain proper tip clearances.

What is needed is a jet engine which supports the turbine bearings without the need for a heavy engine frame and which allows the use of high pressure sloped turbine blades without requiring centrifugal-load-imposing blade shrouds.

SUMMARY OF THE INVENTION

It is an object of the invention to provide a jet engine having improved specific fuel consumption.

It is another object of the invention to provide such an engine which eliminates the expensive and heavy engine frame supporting the turbine in conventional jet engine designs.

It is a further object of the invention to provide a turbine bearing support for such an engine which allows the use of high pressure sloped turbine blades which are unshrouded blades.

In a first embodiment, the jet engine subassembly of the invention includes a turbine shaft, a turbine ball bearing assembly, a combustor outer casing, more than one tie rod, a compressor diffuser, and axial-load-supporting apparatus. The bearing has a turbine inner race and a turbine outer race. The turbine inner race is attached to the shaft near the shaft's aft portion. The generally radially-extending tie rods each have a radially innermost end attached to the turbine outer race and a radially outermost end attached to the combustor outer casing near the casing's aft end. The compressor diffuser's radially outer duct is attached to the combustor outer casing near the casing's forward end. The generally longitudinally-extending, axial-load-supporting apparatus, for structurally supporting an axial load between the turbine outer race and the compressor diffuser's radially inner duct, is radially positioned generally entirely inward of the compressor diffuser s radially inner duct.

Several benefits and advantages are derived from the invention. The radial-load-supporting tie rods and the axial-load-supporting apparatus support the turbine ball bearing assembly without the need for a conventional heavy turbine engine frame. This improves specific fuel consumption. The turbine ball bearing assembly experiences no thermal axial growth because both the inner and outer race axially capture the roller bearing which therefore is not free to axially slide with respect to either race under thermal growth conditions. This allows the use of unshrouded high pressure sloped turbine blades. The elimination of the blade shrouds eliminates the centrifugal loads imposed by the shrouds on the blades.

BRIEF DESCRIPTION OF THE DRAWINGS

The accompanying drawing illustrates an embodiment of the present invention wherein:

DETAILED DESCRIPTION OF THE INVENTION

Figure 1:
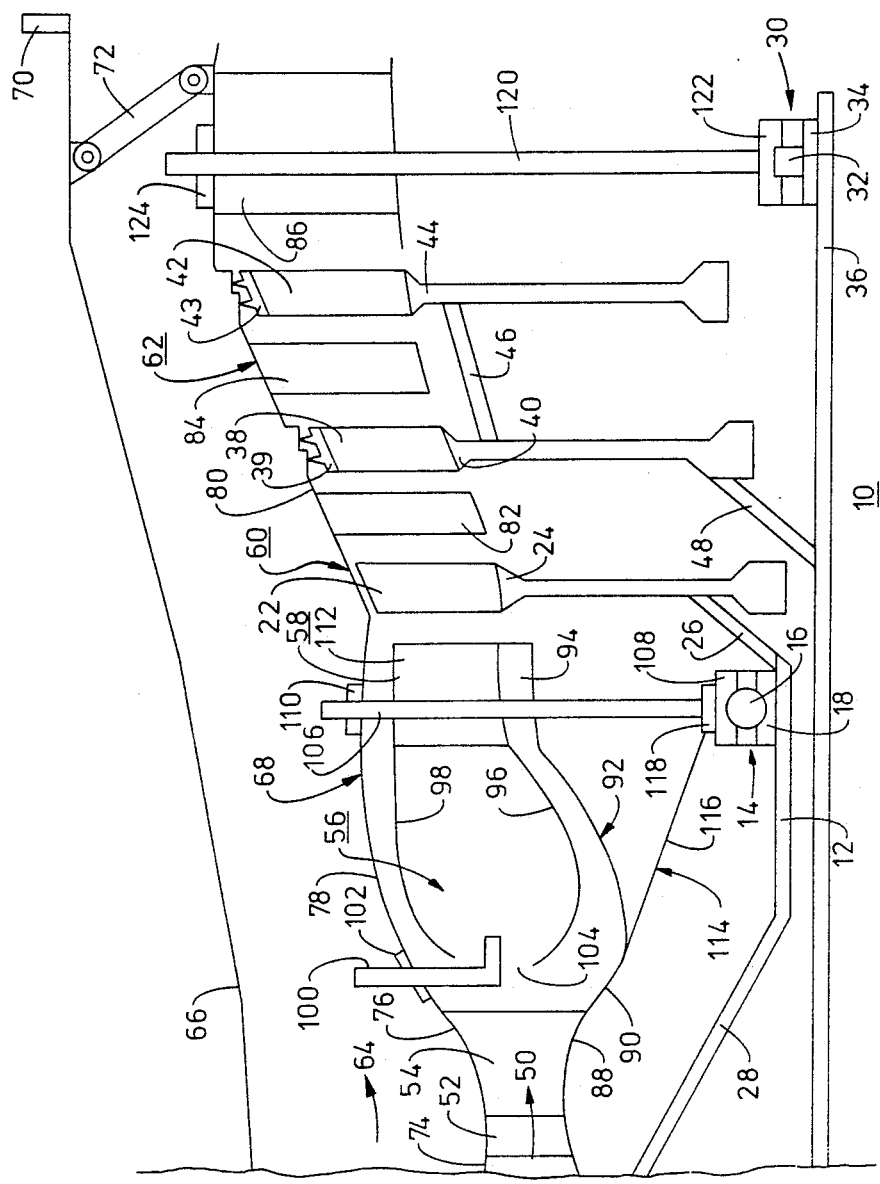
FIG. 1 is a schematic cross-sectional view of a portion of a bypass turbofan jet engine including a subassembly showing the engine's combustor and turbine region.

The jet engine subassembly 10 of the present invention, as shown in a portion of a bypass turbofan jet engine in FIG. 1, includes a high pressure (HP) turbine shaft 12. An HP turbine ball bearing assembly 14 contains a plurality of ball bearings 16 and has an HP turbine inner race 18 which is attached to the HP turbine shaft 12 near the shaft's aft portion. It is noted that throughout the description of the present invention, when two parts are said to be "attached", they may be connected together through one or more intermediate connecting structures or they may be connected directly together without any interposing structure. A forward-most row of unshrouded HP sloped turbine blades 22 is attached to an HP turbine disk 24 which is attached by a disk cone 26 to the HP turbine shaft 12, the attachments all being longitudinally aft of the HP turbine ball bearing assembly 14. As previously mentioned, a sloped turbine blade is herein defined to be a turbine blade with a sloped blade tip. A compressor disk cone 28 is attached to the HP turbine shaft 12 forward of the ball bearing assembly 14. The ball bearing assembly 14 is the fixed thrust bearing which does not axially move with thermal growth of the HP turbine shaft 12. The other end (not shown) of this outer shaft could be attached to a compressor roller bearing assembly which would axially move with thermal growth of the outer shaft.

A low pressure (LP) turbine roller bearing assembly 30 contains a plurality of roller bearings 32 and has an LP turbine inner race 34 which is attached to an LP turbine shaft 36 near the shaft's aft portion. A first row of shrouded LP sloped turbine blades 38 (having shrouds 39) is attached to a first LP turbine disk 40, and a second row of shrouded LP sloped turbine blades 42 (having shrouds 43) is attached to a second LP turbine disk 44. A spacer 46 interconnects the two LP turbine disks 40 and 44. The first LP turbine disk 40 is attached by a disk cone 48 to the LP turbine shaft 36, the attachments all being longitudinally forward of the LP turbine roller bearing assembly 30. The roller bearing assembly 30 axially moves with thermal growth of the LP turbine shaft 36. The other end (not shown) of this inner shaft could be attached to a fan ball bearing assembly which would be the fixed thrust bearing and which would not axially move with thermal growth of the LP turbine shaft.

The inner airflow path 50 of the bypass turbofan engine, as seen in FIG. 1, has core engine air flowing past an aft-most row of compressor guide vanes 52 and through a compressor diffuser 54, a combustor 56, an HP turbine nozzle 58, the HP turbine 60, and the LP turbine 62.

The outer airflow path 64 of the bypass turbofan engine, as seen in FIG. 1, has bypass air flowing between an engine outer duct 66 and an engine inner duct 68. The outer duct 66 has an aft flange 70 for attachment to the engine's exhaust nozzle (not shown). The inner and outer ducts 68 and 66 are attached together by a linkage 72. FIG. 1 shows the engine outer duct 66 to include a portion of a compressor guide vane casing 74, the radially outer duct 76 of the compressor diffuser 54, the outer casing 78 of the combustor 56, and the HP/LP turbine stator casing 80. The HP/LP turbine stator casing 80 supports a row of HP turbine stators 82, a first row of LP turbine stators 84, and a second row of LP turbine stators 86 (also known as outlet guide vanes 86). The compressor diffuser's radially outer duct 76 is attached to the combustor outer casing 78 proximate the casing's forward end. The compressor diffuser's radially inner duct 88 is attached to the front segment 90 of the combustor inner casing 92. The combustor inner casing's aft segment 94 is attached to an aft part of the HP turbine nozzle 58. The front part of the HP turbine nozzle 58 is attached to an aft section of the combustor's inner and outer liners 96 and 98. The fuel nozzles 100 enter through bosses 102 on the combustor outer casing 78 and inject fuel into a front entrance 104 between the combustor's inner and outer liners 96 and 98.

Support for the HP turbine 60 includes a plurality of generally radially-extending tie rods 106 each having a radially innermost end attached to the HP turbine ball bearing assembly's outer race 108 and each having a radially outermost end attached by nuts 110 to the combustor outer casing 78 proximate the casing's aft end to support a radial load between the outer race 108 and the outer casing 78. The HP turbine nozzle 58 contains a multiplicity of radially-extending turbine nozzle vanes 112, and preferably each of the HP tie rods 106 passes through a corresponding turbine nozzle vane 112.

Support for the HP turbine 60 further includes generally longitudinally-extending means 114 for structurally supporting an axial load between the HP turbine ball bearing assembly's outer race 108 and the compressor diffuser's radially inner duct 88. The axial-load-supporting means 114 is radially disposed generally entirely inward of the compressor diffuser's radially inner duct 88, is preferably independent of the HP tie rods 106, and is preferably longitudinally disposed generally entirely forward of the HP tie rods 106. In an exemplary embodiment, such axial-load-supporting means 114 includes the combustor inner casing s front segment 90 having a forward portion attached to the compressor diffuser's radially inner duct 88 and includes an axial support cone 116 having one support cone end attached to the HP turbine ball bearing assembly's outer race 108 and having the other support cone end attached to the aft portion of the combustor inner casing's front segment 90. Other such means include the previously mentioned axial support cone having its other support cone end connected directly to the combustor diffuser's radially inner duct without any intervening combustor inner casing front segment. Additional means include various tie bars, spokes, cones, and the like, and combinations thereof, providing axial load supporting structure between the HP turbine ball bearing assembly's outer race 108 and the compressor diffuser's radially inner duct 88, as can be appreciated by those skilled in the art. It is noted that the attachment of the axial support cone 116 and the HP tie rods 106 to the HP turbine ball bearing assembly's outer race 108 is preferably accomplished through an intermediate inner ring 118.

Support for the LP turbine 62 includes a Plurality of generally radially-extending tie rods 120 each having a radially innermost end attached to the LP turbine roller bearing assembly's outer race 122 and each having a radiallY outermost end attached by nuts 124 to the HP/LP turbine stator casing 80 proximate the casing's aft end to support a radial load between the outer race 122 and the stator casing 80. Preferably, each of the LP tie rods 120 passes through a corresponding outlet guide vane 86. Since the roller bearing 32 slides with respect to axial movement of the LP turbine shaft 36, no axialload-supporting apparatus is needed for the LP turbine outer race 122.

It is noted that the invention eliminates the conventional turbine engine frame and provides in its place a structure including a rigid HP turbine support which utilizes radially-extending HP tie rods 106 and an axial load bearing support cone 116 all attached to the outer race 108 of an HP turbine ball bearing assembly 14.

The foregoing description of several preferred embodiments of the invention has been presented for purposes of illustration. It is not intended to be exhaustive or to limit the invention in the precise form disclosed, (such as a particular number of HP and/or LP turbine blade and stator rows) and obviously many modifications and variations are possible in light of the above teaching.

We claim:

1. A jet engine subassembly comprising:
   (a) a turbine shaft having an aft portion;
   (b) a turbine ball bearing assembly having a turbine inner race attached to said turbine shaft proximate said aft portion and having a turbine outer race;
   (c) a combustor outer casing having a forward end and an aft end;
   (e) a plurality of straight and radially-extending tie rods each having a radially innermost end attached to said turbine outer race and having a radially outermost end attached to said combustor outer casing proximate said aft end, said tie rods together being disposed to lie in a plane which is perpendicular to said turbine shaft;
   (f) a compressor diffuser having a radially outer duct attached to said combustor outer casing proximate said forward end and having a radially inner duct; and
   (g) generally longitudinally-extending, axial-load-supporting means for structurally supporting an axial load between said turbine outer race and said radially inner duct of said compressor diffuser, said axial-load-supporting means radially disposed generally entirely inward of said radially inner duct of said compressor diffuser.

2. The jet engine subassembly of claim 1, wherein said axial-load-supporting means is longitudinally disposed generally entirely forward of said tie rods.

3. The jet engine subassembly of claim 2, wherein said axial-load-supporting means is independent of said tie rods.

4. The jet engine subassembly of claim 3, wherein said axial-load-supporting means includes a combustor inner casing front segment having a forward portion attached to said radially inner duct of said compressor diffuser and having an aft portion, and wherein said axial-load-supporting means also includes an axial support cone having two ends, said axial support cone having one said support cone end attached to said turbine outer race and having another said support cone end attached to said aft portion of said combustor inner casing front segment.

5. The jet engine subassembly of claim 4, also including a turbine nozzle attached to said combustor inner casing and having a multiplicity of turbine nozzle vanes, with each of said tie rods passing through a corresponding said turbine nozzle vane.

6. The jet engine subassembly of claim 1, 4, or 5, also including a forward-most row of turbine blades attached to said turbine shaft proximate and longitudinally aft of said turbine ball bearing assembly.

7. The jet engine subassembly of claim 6, wherein said turbine blades comprise turbine blades whose blade tips are shaped such that the perpendicular distance from said turbine shaft to a point or each of said blade tips will increase as said point is moved aft along each of said blade tips.

8. The jet engine subassembly of claim 7, wherein each of said sloped turbine blades is without a blade-attached shroud.

9. The jet engine subassembly of claim 8, wherein said turbine shaft is a high pressure turbine shaft and said forward-most row of unshrouded sloped turbine blades is a forward-most row of unshrouded high pressure sloped turbine blades.

* * * * *